US012442599B2

(12) United States Patent
Augustyn et al.

(10) Patent No.: US 12,442,599 B2
(45) Date of Patent: Oct. 14, 2025

(54) HEAT EXCHANGER WITH OPTIMUM BAFFLE

(71) Applicant: Valeo Autosystemy Sp. z o.o., Skawina (PL)

(72) Inventors: Milosz Augustyn, Skawina (PL); Michal Belzowski, Skawina (PL); Zbigniew Figiel, Skawina (PL); Dawid Szostek, Skawina (PL); Tomasz Stramecki, Skawina (PL)

(73) Assignee: Valeo Autosystemy Sp. z o.o., Skawina (PL)

( * ) Notice: Subject to any disclaimer, the term of this patent is extended or adjusted under 35 U.S.C. 154(b) by 246 days.

(21) Appl. No.: 17/773,943

(22) PCT Filed: Oct. 21, 2020

(86) PCT No.: PCT/EP2020/079622
§ 371 (c)(1),
(2) Date: May 3, 2022

(87) PCT Pub. No.: WO2021/089326
PCT Pub. Date: May 14, 2021

(65) Prior Publication Data
US 2022/0381517 A1    Dec. 1, 2022

(30) Foreign Application Priority Data

Nov. 6, 2019   (EP) ..................................... 19461601

(51) Int. Cl.
*F28D 7/16* (2006.01)
*F28D 9/00* (2006.01)
*F28F 9/22* (2006.01)

(52) U.S. Cl.
CPC ......... *F28D 7/1692* (2013.01); *F28D 9/0006* (2013.01); *F28D 9/0031* (2013.01); *F28F 9/22* (2013.01); *F28F 2009/224* (2013.01)

(58) Field of Classification Search
CPC ...... F28D 7/1692; F28D 7/163; F28D 7/1646; F28D 7/06; F28D 9/0031; F28F 9/22; F28F 2009/222
See application file for complete search history.

(56) References Cited

U.S. PATENT DOCUMENTS

| | | | | |
|---|---|---|---|---|
| 1,688,183 | A | * 10/1928 | Frank | F28D 7/1646 165/DIG. 411 |
| 2021/0325118 | A1 | * 10/2021 | Shen | F28D 9/0031 |
| 2022/0381517 | A1 | * 12/2022 | Augustyn | F28F 9/22 |

FOREIGN PATENT DOCUMENTS

| | | | | |
|---|---|---|---|---|
| CN | 112432521 | A * | 3/2021 | ............. F01M 5/002 |
| CN | 114909926 | A * | 8/2022 | |

(Continued)

OTHER PUBLICATIONS

Translation of German Patent Document DE889005C named Translation-DE889005C (Year: 1953).*

(Continued)

*Primary Examiner* — Paul Alvare
(74) *Attorney, Agent, or Firm* — Osha Bergman Watanabe & Burton LLP

(57) ABSTRACT

A heat exchanger, in particular for a motor vehicle, including: a first conduit for a first fluid, including a first manifold, a second manifold, and a plurality of tubes arranged in at least two parallel stacks having a first terminal tube and a second terminal tube opposite to the first terminal tube, the tubes being fluidly connected with the first manifold and the second manifold to provide at least one U-turn for the first fluid; a second conduit for a second fluid including a housing body arranged to at least partially encapsulate the first (Continued)

conduit, wherein the second conduit is fluidly isolated from the first conduit and, a baffle plate deployed in-between the stacks of the tubes and the manifolds, enabling a U-turn of the second fluid in the vicinity of the first manifold, characterised in that, the baffle plate includes a first restricting member protruding towards the first manifold, configured to partially limit the U-turn of the second fluid at the level of the first terminal tubes of the stacks.

13 Claims, 4 Drawing Sheets

(56) References Cited

FOREIGN PATENT DOCUMENTS

| | | | | |
|---|---|---|---|---|
| DE | 882095 C | * | 7/1953 | |
| DE | 889005 C | * | 9/1953 | |
| DE | 3140687 A1 | * | 4/1983 | |
| DE | 19523475 C1 | * | 11/1996 | ........... F28D 9/0012 |
| FR | 2912811 A1 | * | 8/2008 | ........... F28D 7/1692 |
| FR | 3045804 A1 | * | 6/2017 | ........... F28D 7/1692 |
| FR | 3045807 A1 | * | 6/2017 | ........... F28D 7/0025 |
| GB | 763647 A | * | 1/2013 | |
| JP | 2001027158 A | * | 1/2001 | ............... F28D 7/16 |

OTHER PUBLICATIONS

Translation of French Patent Document FR2912811A1 named Translation-FR2912811A1 (Year: 2008).*

* cited by examiner

HEAT EXCHANGER WITH OPTIMUM BAFFLE

FIELD OF THE INVENTION

The invention relates to a heat exchanger, in particular the heat exchanger for a motor vehicle.

BACKGROUND OF THE INVENTION

In order to reduce the impact on climate change and due to meet the standards for $CO_2$ emissions for vehicle refrigerants used in mobile HVAC and refrigerant systems, the new refrigerant such as R744 (carbon dioxide or $CO_2$) has been introduced.

Previous refrigeration systems comprise, for example, the R1234yf refrigerant that has similar properties to R134a. However, its global warming potential or GWP is only 4, as opposed to 1430. The refrigerant R744 has been assigned a GWP value of 1 and functions as the reference gas.

Parallelly to the evolution of hybrid vehicles (e.g. PHEVs) and fully electric vehicles (e.g. EVs) the interest in cooling electronics and batteries has constantly increased. As the result, a new devices were developed. One of the examples of such devices is a water chiller.

The water chiller is a compact heat exchanger using one medium used in vehicle's refrigeration system (e.g. R744) to cool down the other medium (e.g. water, coolant) used for cooling the batteries or electronics in a hybrid or electric vehicles. Consequently, the water chiller must withstand high pressure of refrigerant flowing through the refrigeration circuit. To do so, the metallic core of refrigerant circuit is encapsulated within the synthetic housing of the coolant circuit. The circuit responsible for coolant flow is usually directed to form at least two passes in order to improve packaging while maintaining high efficiency of the heat exchanger. To enable more than one pass for coolant fluid, a baffle may be used.

The baffle directs the coolant fluid to form a U-turn, so that it rinses the elements of the refrigerant circuit which are responsible for cooling thereof, e.g. tubes, plates, etc. However, the baffle plate enables the coolant fluid to pass using whole volume available which may result in an uncontrolled and unbalanced flow between the passes. Consequently, the coolant fluid may bypass, for example, the middle section of the refrigerant circuit core. This phenomena may result in an unbalanced flow of the coolant in these areas which results in decreased chiller performance.

Thus, it would be desired to provide the means of directing the coolant fluid towards the middle section of the refrigerant core to provide a uniform coolant distribution which will result in increased thermal performance of the chiller. Further, it would be desired to limit the flow of the coolant in particular sections rinsing refrigerant core and to promote its flow in the desired sections (e.g. the middle section of the refrigerant core) to further optimize the thermal performance of the heat exchanger. The invention ought to be inexpensive, easy to manufacture, and preferably should not require machining new tools.

SUMMARY OF THE INVENTION

The object of the invention is, among others, a heat exchanger, in particular for a motor vehicle, comprising: a first conduit for a first fluid, comprising a first manifold, a second manifold, and a plurality of tubes arranged in at least two parallel stacks having a first terminal tube and a second terminal tube opposite to the first terminal tube, the tubes being fluidly connected with the first manifold and the second manifold to provide at least one U-turn for the first fluid; a second conduit for a second fluid comprising a housing body arranged to at least partially encapsulate the first conduit, wherein the second conduit is fluidly isolated from the first conduit and, a baffle plate deployed in-between the stacks of the tubes and the manifolds, enabling a U-turn of the second fluid in the vicinity of the first manifold, characterised in that, the baffle plate comprises a first restricting member protruding towards the first manifold, configured to partially limit the U-turn of the second fluid at the level of the first terminal tubes of the stacks.

Preferably, the baffle plate comprises a second restricting member protruding towards the first manifold, configured to partially limit the U-turn of the second fluid at the level of the second terminal tubes of the stacks.

Preferably, the restricting member is essentially rectangular.

Preferably, the first restricting member extends from the first terminal tube towards the top portion of the housing body.

Preferably, the first restricting member enables second fluid to pass along the top portion of the housing body.

Preferably, the second restricting member extends from the second terminal tube towards the bottom portion of the housing body.

Preferably, the baffle plate comprises at least one third restricting member configured to at least partially limit the U-turn of the second fluid at selected level between the first terminal tube and the second terminal tube.

Preferably, the first restricting member enables second fluid to pass between its terminal end and the first manifold.

Preferably, the second restricting member enables second fluid to pass between its terminal end and the first manifold.

Preferably, the restricting member is configured to limit the U-turn of the second fluid at the level of the terminal tube and at least one consecutive tube.

Preferably, the restricting member slopes towards the direction of the consecutive tube, so that the U-turn of the second fluid is gradually increased.

Preferably, the restricting members are in a form of essentially triangular walls sloping from the level of the terminal tubes towards the level of central section of the tubes.

Preferably, the baffle plate comprises a spring member deployed between the first terminal tubes and the second terminal tubes, wherein the spring member interacts with the first manifold, so that the baffle plate is immobilized in its longitudinal direction.

Preferably, the baffle plate comprises at least one recessed section deployed on the edge facing the U-turn.

Preferably, a heat exchange loop, in particular for the motor vehicle battery thermal management system, comprises the heat exchanger.

BRIEF DESCRITPTION OF DRAWINGS

Examples of the invention will be apparent from and described in detail with reference to the accompanying drawings, in which.

DETAILED DESCRIPTION OF EMBODIMENTS

An invention relates to a heat exchangers, wherein at least two media are guided through predetermined paths to exchange the heat between one another. The subject of the invention relates specifically to a heat exchanger 1 applied in a motor vehicle comprising e.g. an internal combustion engine, an electric motor, or a combination of both those types.

The invention comprises the heat exchanger 1 that could serve a purpose of, for example, chilling the water and/or coolant fluid that has been heated while cooling down the batteries in electric vehicle. The medium suitable for chilling the coolant fluid may be, for example, R744 refrigerant. The subject of the invention is described in detail in further paragraphs.

Figure 1:
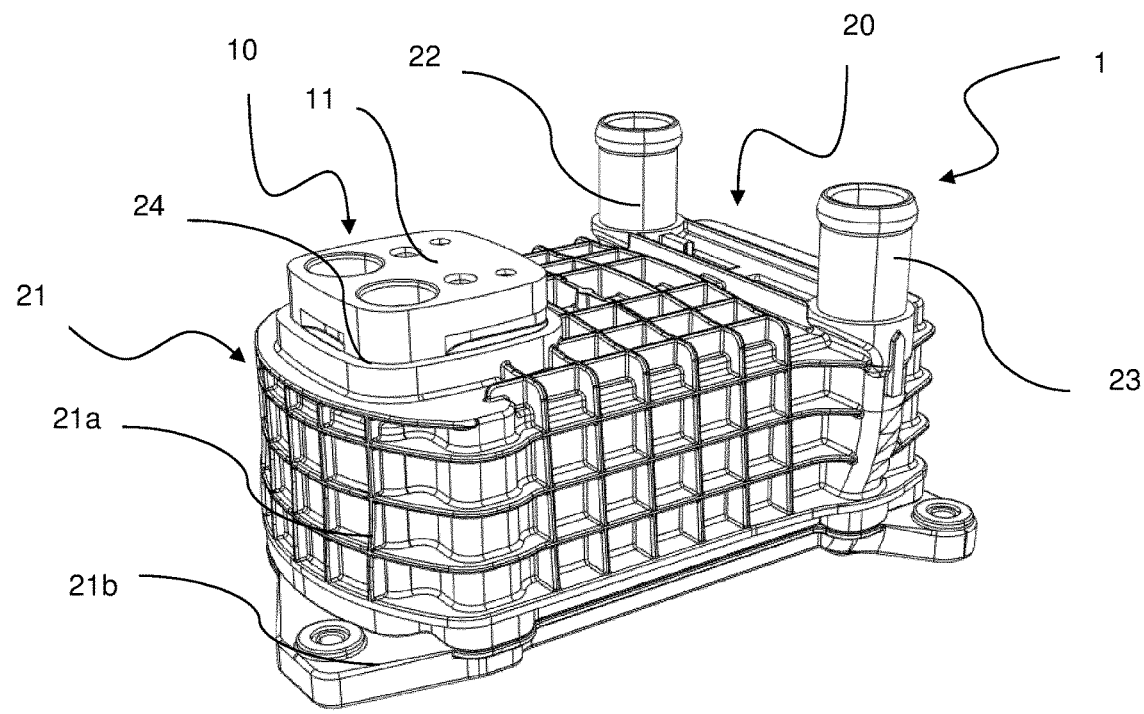
FIG. 1 shows a perspective view of the heat exchanger assembly.

FIG. 1 presents a perspective view of the heat exchanger 1 which may be configured to transfer heat between a first conduit 10 comprising a first fluid and a second conduit 20 comprising a second fluid, wherein the first fluid may be of different properties than the second fluid, e.g. the first fluid is of higher pressure than the second fluid.

The second conduit 20 comprises, inter alia, a housing body 21 comprising at least one inlet 22 and at least one outlet 23 for the second fluid, wherein the inlet 22 is configured to introduce the second fluid into the second conduit 20 and the outlet 23 is configured to collect the second fluid from the second conduit 20. The inlet 22 and the outlet 23 for the second fluid usually comprises a channel protruding from the housing body 21 to enable even second fluid distribution from the top portion to the bottom portion of the housing body 21. As shown in FIG. 1 the inlet 22 and the outlet 22 are deployed parallelly with respect to the channel and they share common main axis, however, other locations of the inlet 22 and/or the outlet 23 are also envisaged. For example, the inlet 22 may be located on the side of the housing body 21 instead. In other words, the main axis of the inlet 22 may be deployed perpendicularly with respect to the main axis of the channel, wherein the channel is still configured to enable even second fluid distribution from the top portion to the bottom portion of the housing body 21. Alternatively, the main axis of the inlet 22 may be deployed angularly with respect to the main axis of the channel, wherein the channel is still configured to enable even second fluid distribution from the top portion to the bottom portion of the housing body 21.

Further, the housing body 21 may be assembled from two elements, i.e. a housing tank 21a and a housing plate 21b.

The housing tank 21a may be in a form of an essentially rectangular container, but similar shapes e.g. cuboidal shape are also envisaged. Term "essentially rectangular" means that one can distinguish two longer sides and two shorter sides of the housing tank 21a which are not necessarily flat, i.e. they may comprise strengthening portions, openings, cavities, etc. The housing tank 21a may comprise an opening 24 configured to enable protruding of sub-components of the first conduit 10, e.g. a connection block 11, from the housing body 21. The housing tank 21a may comprise at least one rounded wall which is usually one of the shorter walls. The housing tank 21a may further comprise one open end for receiving the housing plate 21b. The strengthening protrusions may project outwardly from the housing tank 21a forming, for example, cuboidal mosaic as presented in FIG. 1. This allows using a synthetic material, e.g. plastic, to produce the housing body 21. Consequently, the weight reduction and production costs are facilitated. However, housing tank 21a may be made of metallic material, such as lightweight metal alloy, e.g. aluminum.

The housing tank 21a is usually assembled with the housing plate 21b. The shape of the housing plate 21b usually corresponds to the shape of the open end located on the housing tank 21a. The housing plate 21b usually comprises strengthening elements located on its inner face to provide a flat surface on its outer face suitable for fixing a heat exchanger 1 to, for example, a vehicle's body. The housing plate 21b may further comprise fixing points for fixing the heat exchanger 1 in desired location using, for example, bolts or screws. The housing plate 21b comprises also a collar extending perpendicularly towards the housing tank 21a, wherein the shape of the collar corresponds to the shape to the open end of the housing tank 21a, so that fixing the housing body 21 is facilitated.

Figure 2:
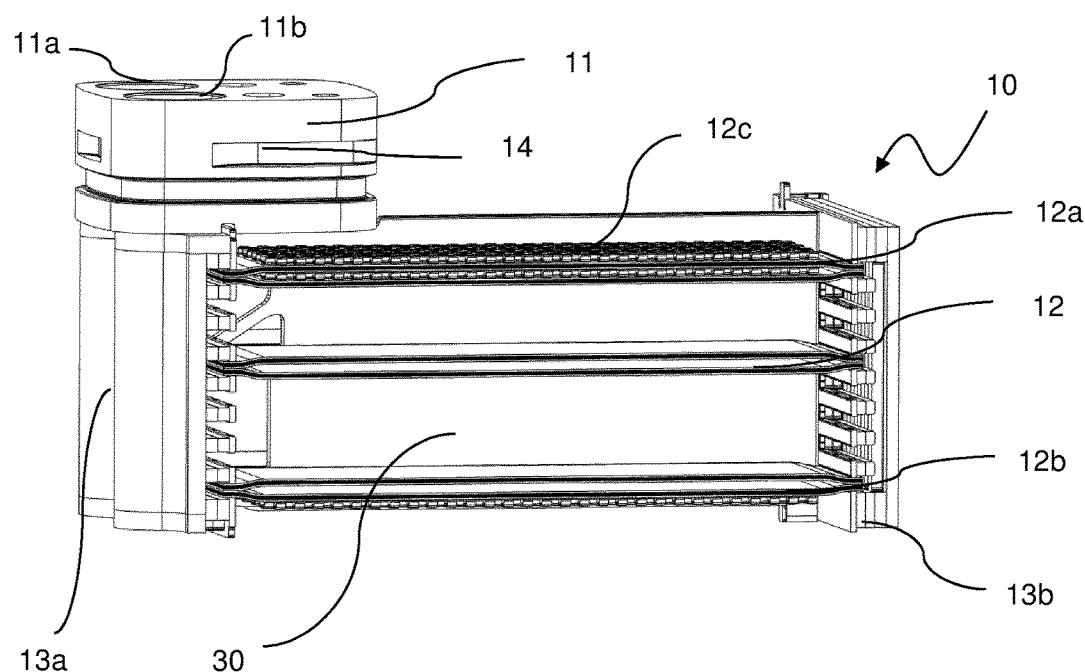
FIG. 2 shows a perspective view of partial cross-section of the first conduit.

FIG. 2 shows a perspective view of the first conduit 10 assembly. The first conduit 10 may comprise the connection block 11, a first manifold 13a, a second manifold 13b, and a plurality of tubes 12. The sub-components assembled in the first conduit 10 may be suitable for transferring the first fluid.

The connection block 11 may be made of a unitary block of material, e.g. the lightweight metal alloy such as aluminum. The shape of the connection block 11 usually corresponds to the shape of the opening 24 located on the housing body 21, so that the connection block 11 may partially project from the housing body 11. Preferably, the connection block 11 is substantially rectangular. Further, the connection block 11 comprises at least one inlet 11a and at least one outlet 11b, wherein the inlet 11a is configured to introduce the first fluid into the first conduit 10 and the outlet 11b is configured to receive the first fluid from the first conduit 10. FIG. 2 shows, the inlet 11a and the outlet 11b, which usually penetrate through the body of the connection block 11 from its top portion towards the rest of the sub-components of the first conduit 10. The inlet 11a and the outlet 11b may have a circular cross-section. The connection block 11 may also comprise a notches 14 that may serve to tightly connect the connector block 11 to the first fluid loop. The notches 14 may have different shape depending on desired connection type. The notches 14 presented in FIG. 2. are basically a cutouts in the connection block 11 material, however other shapes adapted to tightly connect the connector block 11 to the rest of the loop are also envisaged. The notches 14 do not exclude existence of other means of connecting the connection block 11, e.g. bolts, screws, etc., to the other sub-components of the refrigerant loop.

The connection block 11 may also comprise a sealing region suitable for receiving sealing means, e.g. a synthetic gasket. The sealing region may be in a form of cutout along the perimeter of the connection block 11. The sealing region ought to be deployed in the vicinity of the opening 24 located on the housing body 11 to provide the fluid-tight connection between the second conduit 20 and the environment.

The connector block 11 is usually fluidly connected with the first manifold 13a, wherein the first manifold 13a participates in distribution and collection of the first fluid. In its simplest form, the first manifold 13a may usually comprise a first tank and a first header which are configured to determine the flow path through the first conduit 10. The first tank may usually be in a form of a unitary block of material comprising openings for fluid, wherein the first tank has at least two openings on the top to enable fluidal communication between the connection block 11 and the first manifold 13a. Naturally, the first tank is closed on the bottom by e.g. end plate. The first tank is fluidly connected with the first header which comprises several sub-components. The first header usually comprises a first plate comprising slots for receiving at least half the quantity of the tubes 12, i.e. the single slot of the first plate may receive a pair of tubes 12. Alternatively, the slots are configured to receive only one tube 12, so that the quantity of slots deployed on the first plate is equal to the quantity of tubes 12. The first header is tightly connected, for example crimped, with the first tank to ensure proper positioning of the first header with respect to the first tank and to facilitate creation of the fluid-tight connection after e.g. brazing one to the other. Further, the first header comprises at least one second plate deployed between the first plate and the first manifold. The second plate may comprise openings configured to create the passes for first fluid and to direct the flow thereof. Depending on the shape of the first tank and the first header, the first conduit 10 may comprise a simple U-shaped flow path, however, blocking part of the passes in the first tank and opening respective passes in the first header may enable more advanced flow paths for the first fluid.

The second manifold 13b comprises a second tank and a second header, wherein the second manifold 13b plays role of first fluid distributor and does not take part in introducing and/or collecting the first fluid. In other words, the second manifold receives the first fluid from the first portion of the tubes 12 and transfers it to the other portion of the tubes 12. However, different configurations of the second manifold are also envisaged. The second header usually comprises a third plate comprising slots for receiving at least half the quantity of the tubes 12, i.e. the single slot of the second plate may receive a pair of tubes 12. Alternatively, the slots are configured to receive only one tube 12, so that the quantity of slots deployed on the second plate is equal to the quantity of tubes 12 received therein. The second tank comprises, inter alia, a cover plate which is substantially flat and provides closure of the second manifold 13b and at least one fourth plate configured to convey the first fluid from the top portion to the bottom portion of the second manifold 13b. One of the ways to create the fourth plate may be forming a plate with a plurality of parallel openings that provide a fluidal communication with the sub-components of the second header. Further, the second header may also comprise at least one fifth plate deployed between the fourth plate and the second header. The fifth plate may comprise openings configured to create the passes for first fluid that enable fluidal communication between the second header and the second tank. The second header is tightly connected, for example crimped, with the second tank to ensure proper positioning of the first header with respect to the first tank and to facilitate creation of the fluid-tight connection after e.g. brazing one to the other.

The first conduit 10 further comprises a plurality of tubes 12. The tubes 12 are usually deployed between the first manifold 13a and the second manifold 13b to provide a fluidal communication thereof. The tubes 12 may be in a form of plates comprising two longer sides and two shorter sides, wherein the shorter sides usually comprise open ends introduced into the slots of respective headers. Based on the form of the tubes 12, one can easily distinguish its general plane. The tubes 12 may be arranged in at least two parallel stacks, each of them comprising a first terminal tube 12a and a second terminal tube 12b opposite to the first terminal tube 12a. The term "parallel stacks" should be regarded as at least two stacks aligned parallelly, wherein the longer sides of the tubes 12 forming one stack are facing the longer sides of the tubes 12 forming the neighboring stack. Further, each stack may be interlaced with heat dispersion portions 12c, e.g. fins, turbulator fins, and other, wherein the stacks do not share the same set of dispersion portions 12c. This allows the neighboring stacks to be materially separated, so that the gap between the stacks is created. The heat dispersion portions 12c may be interlaced between all tubes 12 forming the stack. Further, the tubes 12 may comprise bended ends that allow forming pairs of tubes 12 which can be introduced into corresponding slots. This enables reducing the amount of connection areas between the tubes 12 and the manifolds 13a, 13b which are mostly vulnerable to leakage. Moreover, it facilitates the second fluid flow between the tubes 12 and in the vicinity of the first manifold 13a. Alternatively, the tubes 12 may be straight, however the quantity of slots in the first manifold 13a and the second manifold 13b ought to be increased accordingly. To provide a fluid-tight and rigid connection between the tubes 12 and the manifolds 13a, 13b, the ends of each tube 12 are introduced into their respective manifolds 13a, 13b, so that they entirely penetrate the first plate and the third plate, and partially penetrate the second plate and the fifth plate.

The baffle plate 30 may be deployed in-between and perpendicularly to the neighboring stacks of tubes 12, as shown in FIG. 2. One should take into account the fact, that some quantities of the tubes 12 and the dispersion portions 12c have been omitted for the sake of clarity. This enables to clearly show the location of the baffle plate 30.

The baffle plate 30 does not directly arrange the flow of the first fluid through the first conduit 10, yet it enables a fluidal co-operation of the first conduit 10 and the second conduit 20 in terms of heat exchange. In other words, the baffle plate 30 directs the second fluid of the second conduit 20 to maximize the heat exchange with the first fluid of the first conduit 10. The baffle plate 30 will be further discussed in forthcoming paragraphs.

Figure 3:
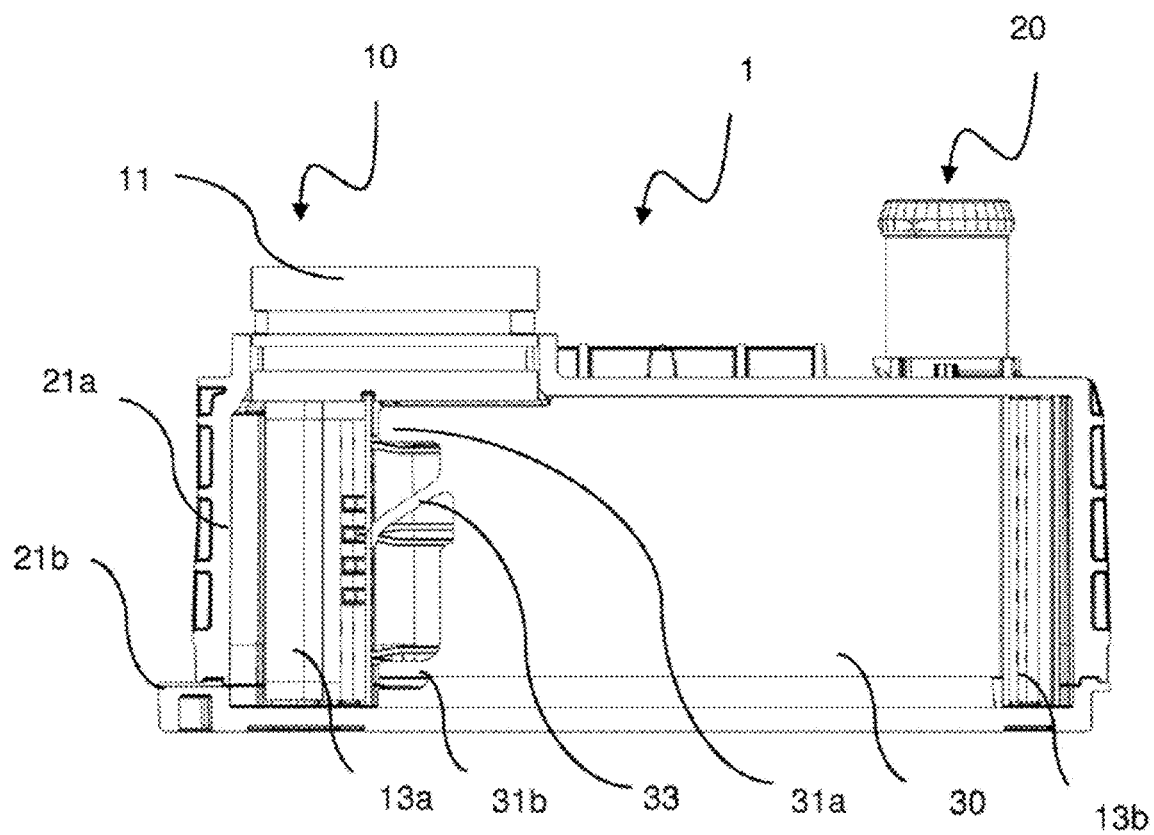
FIG. 3 shows a cross-section of the heat exchanger assembly.

FIG. 3 shows a cross-sectional view of the heat exchanger 1 assembly. One must take into account the fact, that the tubes 12 have been completely omitted for the sake of clarity, but they should not be regarded as non-existing. The assembly comprises the first conduit 10, the second conduit 20 and the baffle plate 30 that enables fluidal co-operation between them in terms of heat exchange.

The housing body 11 encapsulates the first conduit 10 and the baffle plate 30 as well as it delimits the flow of the second fluid in the second conduit 20.

The baffle plate 30 directs the second fluid entering the housing body 21 by an inlet 22 towards the first manifold 13a, so that the first passage for second fluid is formed and the second fluid may rinse at least one stack of tubes 12. In other words, the baffle plate 30 may be deployed in-between the stacks of the tubes 12 and the manifolds 13a, 13b enabling a U-turn of the second fluid in the vicinity of the first manifold 13a. Thereafter, the second fluid passes the area between the stacks of tubes 12 which is unoccupied by the baffle plate 30. This allows entering the second fluid to the second passage that, in the basic embodiment of an invention, directs the second fluid towards the outlet 23. Similarly to the first passage, the second fluid may rinse at least one stack of tubes 12. The baffle plate 30 usually comprises at least one spring member 33 leaning against the first manifold 13a, so that the baffle plate is pushed towards the second manifold 13b. This facilitates the baffle plate 30 to be properly embedded between the first manifold 13a and the second manifold 13b.

Both first conduit 10 and the second conduit 20 may comprise more than two passes for the respective fluids. For example, the heat exchanger 1 may comprise two baffle plates 30 that will determine existence of at least three passes for the second fluid and at least three stacks of tubes 12 for the first fluid. Therefore the embodiments, wherein the heat exchanger comprises odd or even number of baffle plates 30 are also envisaged.

To increase overall efficiency of the heat exchanger 1, the second fluid usually flows through the second conduit 20 in the opposite direction with respect to the first fluid flowing through the first conduit 10 through all passes comprised within the heat exchanger 1. Alternatively, the second fluid may flow through the second conduit 20 in the same direction with respect to the first fluid flowing through the first conduit 10 through all passes comprised within the heat exchanger 1, however it could negatively impact the efficiency thereof.

The second conduit 20 usually performs a U-turn using the whole space available between the inner face of the housing tank 21a and the inner face of the housing plate 21b. This promotes the second fluid flow along the upper wall of the housing tank 21a and the housing plate 21b. Consequently, it may lead to the limited flow of the second fluid in the central section of the second conduit 20.

Figure 4:
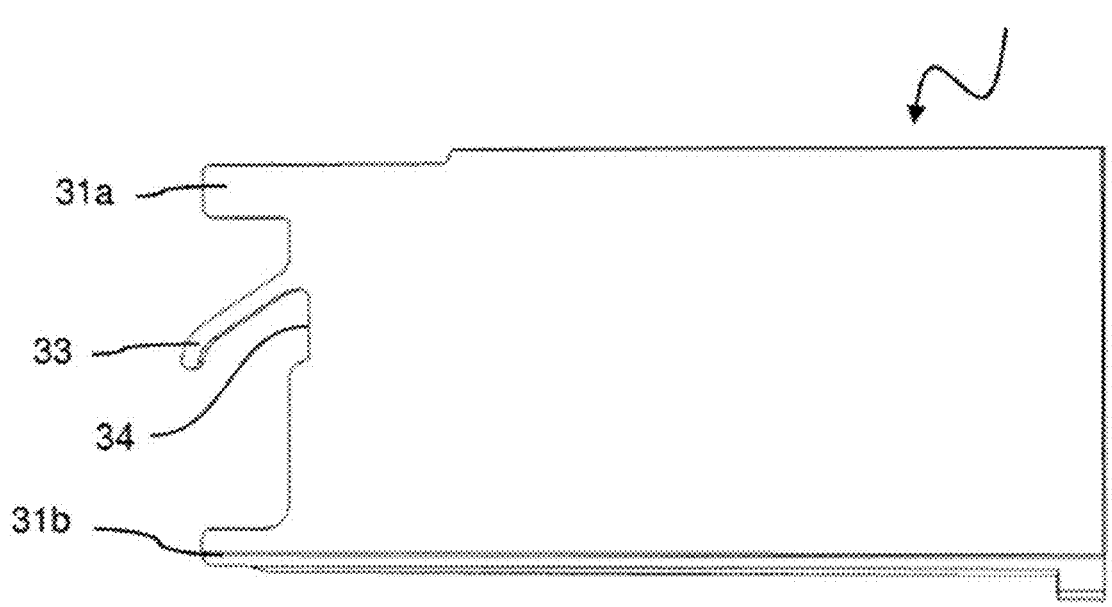
FIG. 4 shows the first exemplary baffle plate in one of the embodiments.

FIG. 4 shows means of mitigating the above-mentioned phenomena. The baffle plate 30 may comprise a first restricting member 31a protruding towards the first manifold 13a, configured to partially limit the U-turn of the second fluid at the level of the first terminal tubes 12a of the stacks. Ideally, this would direct the second fluid towards the central section of the tubes 12. The central section of the tubes 12 should be regarded as the portion of the tubes 12 that is deployed relatively centrally between the first terminal tubes 12a and second terminal tubes 12b of each stack. The first restricting member 31a does not close the passage for the second fluid completely- it enables second fluid to pass along the top portion of the housing body 21.

The first restricting member 31a usually extends from the first terminal tube 12a towards the top portion of the housing body 21, so as to form a passage in the vicinity of the inner face of the housing tank 21a or the connection block 11, if applied. This enables to limit the flow of the second fluid that rinses the top portion of the first terminal tube 12a and direct it towards the central portion of the tubes 12. The first restricting member 31a usually extends from the first terminal tube 12a towards the top portion of the housing body 21 for the height of at least two first terminal tubes 12a.

Further, the first restricting member 31a enables second fluid to pass between its terminal end and the first manifold 13a. Since there is no contact between the wall of first manifold 13a and the terminal wall of the first restricting member 31a that faces the first manifold 13a, the second fluid may pass between these elements, so that the first restricting member 31a does not completely block the passage for second fluid in the vicinity of the first manifold 13a.

Alternatively, the baffle plate 30 may comprise a second restricting member 31b protruding towards the first manifold 13a, configured to partially limit the U-turn of the second fluid at the level of the second terminal tubes 12b of the stacks. Ideally, this would direct the second fluid towards the central section of tubes 12. The second restricting member 31b does not completely close the passage for the second fluid-it enables second fluid to pass along the bottom portion of the housing body 21.

The second restricting member 31b usually extends from the second terminal tube 12b towards the bottom portion of the housing body 21, so as to form a passage in the vicinity of the inner face of the housing plate 21b. This enables to limit the flow of the second fluid that the second terminal tube 12b. The second restricting member 31b usually extends from the second terminal tube 12b towards the bottom portion of the housing body 21 for the height of at least two second terminal tubes 12b.

Further, the second restricting member 31b enables second fluid to pass between its terminal end and the first manifold 13a. Since there is no contact between the wall of first manifold 13a and the terminal wall of the second restricting member 31a that faces the first manifold 13a, the second fluid may pass between these elements, so that the second restricting member 31b does not completely block the passage for second fluid in the vicinity of the first manifold 13a.

In the preferred embodiment of the invention, the baffle plate 30 may comprise both the first restricting member 31a and the second restricting member 31b. A pair of restricting members 31a, 31b exhibit additive properties of the first restricting member 31a and the second restricting member 31b, so that they fluidly co-operate with the second fluid of the second conduit 20. In other words, the restricting members 31a, 31b partially limit the flow of the second fluid in the vicinity of U-turn formed by the baffle plate 30 to direct the greater amount of the second fluid towards the central section of the tubes 12 of each stack. This enables to maximize the overall efficiency of the heat exchanger 1, because bypassing the tubes 12 over and under the heat exchange area is now limited. Consequently, the amount of the second fluid that is able to exchange the heat with the first fluid may be optimized.

The above-mentioned embodiments may be further modified to optimize the heat exchange between the first conduit 10 and the second conduit 20. The examples of such modifications are described in forthcoming paragraphs.

Figure 5:
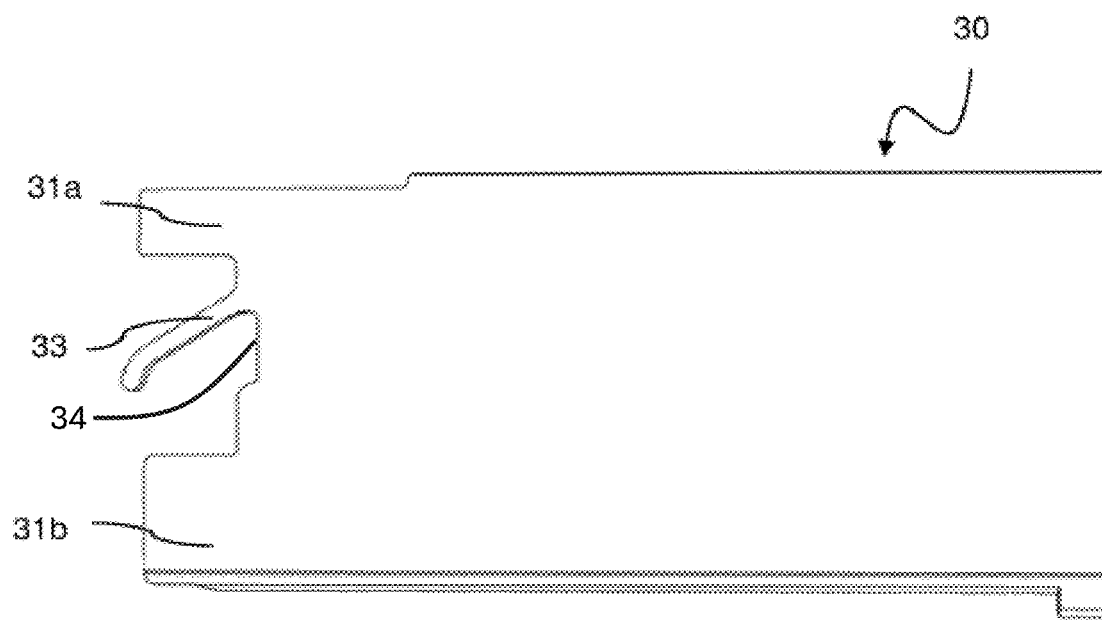
FIG. 5 shows the second exemplary baffle plate in one of the embodiments.

FIG. 5 shows the baffle plate 30 comprising the first restricting member 31a forming an essentially rectangular walls extending towards the housing plate 21b configured to limit the U-turn of the second fluid at the level of the first terminal tube 12a and at least one consecutive tube 12.

Analogically to previous paragraph, the baffle plate 30 may further comprise the second restricting member 31b forming an essentially rectangular walls extending towards the housing tank 21a configured to limit the U-turn of the second fluid at the level of the second terminal tube 12b and at least one consecutive tube 12.

Figure 6:
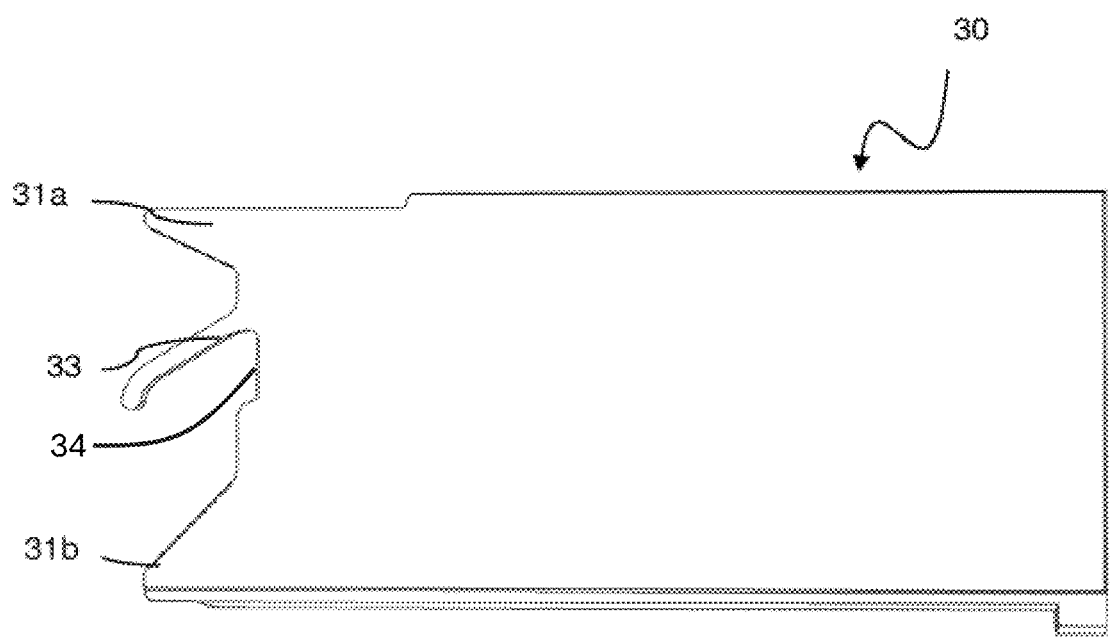
FIG. 6 shows the third exemplary baffle plate in one of the embodiments.

FIG. 6 shows the baffle plate 30 comprising the first restricting member 31a forming an essentially triangular walls sloping from the level of the first terminal tube 12a towards the level of central section of the tubes 12.

Analogically to previous paragraph, the baffle plate 30 may further comprise the first restricting member 31a forming an essentially triangular walls sloping from the level of the first terminal tube 12a towards the level of central section of the tubes 12. This enables to gradually increase the flow of the second fluid through the U-turn to further optimize the flow in the second conduit 20.

Figure 7:
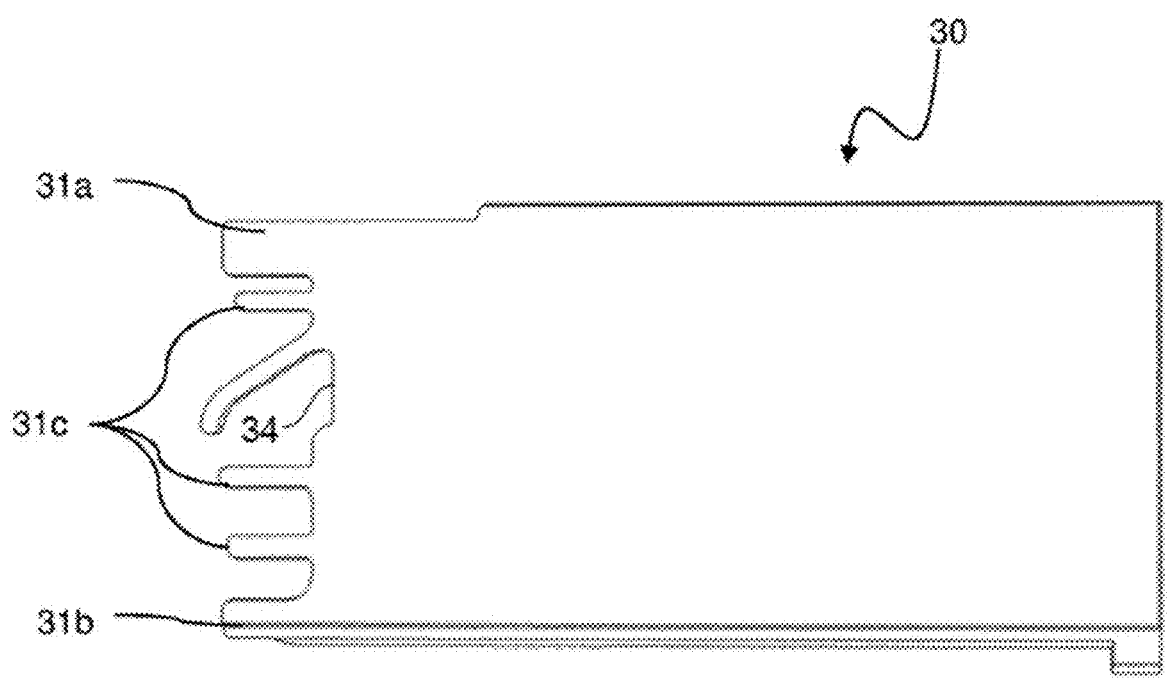
FIG. 7 shows the fourth exemplary baffle plate in one of the embodiments.

FIG. 7 shows the baffle plate 30 comprising at least one third restricting member 31c configured to at least partially limit the U-turn of the second fluid at selected level between the first terminal tube 12a and the second terminal tube 12b. The third restricting member 31c may have a similar shape to the first restricting member 31a or the second restricting member 31b, however, it does not need to extend towards the first manifold 13a to the same extent as, for example, the first restricting member 31a does. The third restricting member 31c may be deployed on the baffle plate 30 along with the first restricting member 31a, the second restricting member 31b or with both first and second restricting members 31a, 31b. The third restricting member 31c enables selective optimization of the second fluid flow in the areas of the U-turn that have not been covered by the first restricting member 31a and/or the second restricting member 31b. In one of the embodiments, the baffle plate 30 may comprise a plurality of third restricting members 31c forming a comb-like structure.

The baffle plate 30 may also comprise at least one recessed section 34 deployed on the edge facing the U-turn between the first restricting member 31a and the second restricting member 31b. The recessed section may increase the available area for performing a U-turn by the second fluid.

The first restricting member 31a, the second restricting member 31b and the third restricting member 31c are usually materially integrated with the baffle plate 30. The baffle plate 30 comprising all possible embodiments of an invention may be carried out by processing the material, e.g. cutting, stamping, laser cutting, water jetting, and other.

Other variations to the disclosed embodiments can be understood and effected by those skilled in the art in practicing the claimed invention, from a study of drawings, the disclosure, and the appended claims. The mere fact that certain measures are recited in mutually different dependent claims does not indicate that a combination of these measures cannot be used to the advantage.

The invention claimed is:

1. A heat exchanger for a motor vehicle, comprising:
    a first conduit for a first fluid, comprising a first manifold, a second manifold, and a plurality of tubes arranged in at least two parallel stacks having a first terminal tube and a second terminal tube opposite to the first terminal tube, the tubes being fluidly connected with the first manifold and the second manifold to provide at least one U-turn for the first fluid;
    a second conduit for a second fluid comprising a housing body arranged to encapsulate at least partly the first conduit, wherein the second conduit is fluidly isolated from the first conduit; and
    a baffle plate deployed in-between the stacks of the tubes and the manifolds enabling a U-turn of the second fluid between the baffle plate and the first manifold,
    wherein the baffle plate comprises a first restricting member protruding towards the first manifold, configured to:
        partially limit the U-turn of the second fluid at the level of the first terminal tubes of the stacks, and
        reduce a volumetric flow of the second fluid flowing over a top portion of the first terminal tube when compared to the flow of the second fluid at any other point within the heat exchanger,
    wherein the volumetric flow of the second fluid flowing under the second terminal tube is also reduced when compared to the flow of the second fluid at any other point within the heat exchanger,
    wherein a portion of the flow of the second fluid is directed towards a central portion of the plurality of tubes,
    wherein the first restricting member enables the second fluid to pass along the top portion of the housing body, and
    wherein the first restricting member slopes towards the direction of the consecutive tube, so that the U-turn of the second fluid is gradually increased.

2. The heat exchanger according to claim 1, wherein the baffle plate further comprises a second restricting member protruding towards the first manifold, configured to:
    partially limit the U-turn of the second fluid at the level of the second terminal tubes of the stacks, and
    reduce the flow of the second fluid flowing under the second terminal tube.

3. The heat exchanger according to claim 2, wherein the restricting members are rectangular.

4. The heat exchanger according to claim 1, wherein the first restricting member extends from the first terminal tube towards the top portion of the housing body.

5. The heat exchanger according to claim 2, wherein the second restricting member extends from the second terminal tube towards the bottom portion of the housing body.

6. The heat exchanger according to claim 2, wherein the baffle plate further comprises at least one third restricting member configured to at least partially limit the U-turn of the second fluid at selected level between the first terminal tube and the second terminal tube.

7. The heat exchanger according to claim 1, wherein the first restricting member enables the second fluid to pass between a terminal end of the first restricting member and the first manifold.

8. The heat exchanger according to claim 2, wherein the second restricting member enables the second fluid to pass between a terminal end of the second restricting member and the first manifold.

9. The heat exchanger according to claim 2, wherein the restricting members are configured to limit the U-turn of the second fluid at the level of the first terminal tube, the second terminal tube and at least one consecutive tube.

10. The heat exchanger according to claim 2, wherein the restricting members are in a form of triangular walls sloping from the level of each of the respective terminal tubes towards the level of central section of the tubes.

11. The heat exchanger according to claim 1, wherein the baffle plate further comprises a spring member deployed in the area between the first terminal tubes and the second terminal tubes, wherein the spring member interacts with the first manifold, so that the baffle plate is immobilized in its longitudinal direction.

12. The heat exchanger according to claim 1, wherein the baffle plate further comprises at least one recessed section that forms an edge facing the U-turn.

13. A heat exchange loop, in particular for a motor vehicle battery thermal management system, comprising the heat exchanger according to claim 2.

* * * * *